Oct. 27, 1959 G. A. LASKO 2,910,036
SPEEDOMETER INDICATING MEANS
Filed May 27, 1955

INVENTOR.
GEORGE A. LASKO
BY
Falvey, Souther & Stoltenberg
attys

United States Patent Office 2,910,036
Patented Oct. 27, 1959

2,910,036

SPEEDOMETER INDICATING MEANS

George A. Lasko, Toledo, Ohio

Application May 27, 1955, Serial No. 511,677

2 Claims. (Cl. 116—57)

This invention relates to indicators, more particularly to the "so-called" straight line indicators useful on the dashboard of automobiles.

The indicator disclosed herein contemplates the provision of an indicator particularly applicable to a speedometer which indicates miles per hour in substantially a straight line along a horizontal or vertical slot which compensates for parallax to give a more accurate indication. The parts of the device may also be arranged in a manner to give an arrowhead indication visible to an observer in which the point of the arrowhead gives the correct reading of the instrument to be indicated.

The invention further contemplates the provision of an indicating means wherein the variable visual effect, as seen by an operator to show a change in the physical effect being indicated, is in the same surface as the indicia of the scale with both cooperating with a fixed line, so that changes of the physical effect are brought to the cognizance of the operator solely by an angular change of position of the surface in its change with relation to the fixed line. In this way, parallax is made ineffective and also manufacturing tolerances are compensated for, especially when the surface aforementioned consists of a drum or cylinder with end play thereof under normal means of indicating, seriously changing the indicated reading.

It is, therefore, a principal object of this invention to provide an indicating means wherein the indicia and the varying visual effect are in the same surface, both cooperating with a longitudinal edge of a fixed surface to give an indication based solely on angular change of the surface including the indicia and the varying visual effect.

It is a further object of this invention to provide an indicating system which is substantially free from the effects of parallax.

It is a further object of this invention to provide an indicating system which uses a reflective surface to complete the visual effect of the varying indication to provide an effective and pleasing indication to an observer.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings.

Figure 2:
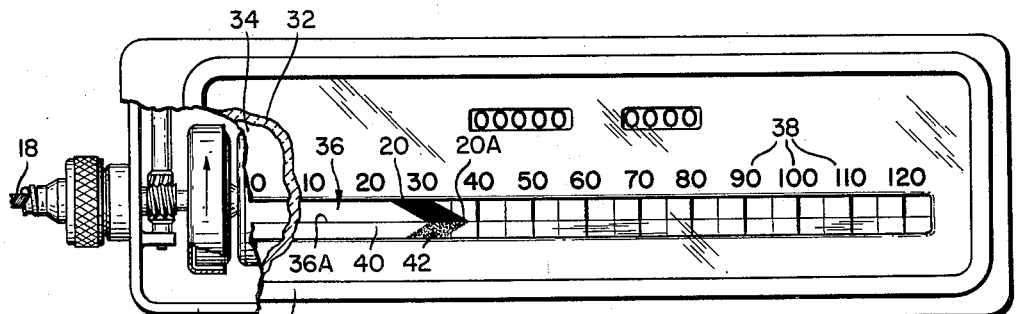
Fig. 2 is an elevational view, partly cut away, to show a complete speedometer incorporating the invention.
Figure 1:
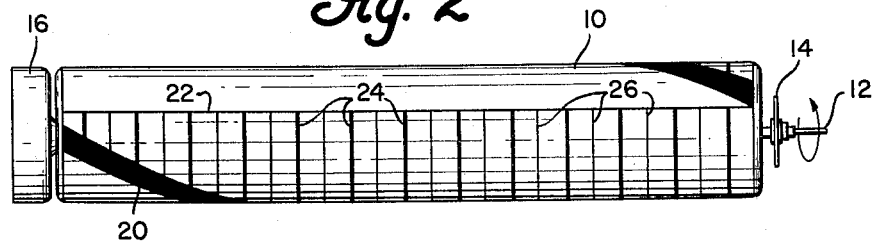
Fig. 1 is an elevational view of the movable indicating element of the invention showing the means of obtaining the variable visual effect and its cooperative relation with the significant indicia lines.

Referring to the drawings, particularly to Figs. 1 and 2, an elongated cylinder 10 is shown which is mounted for rotation on its longitudinal axis by shaft 12 in suitable journals (not shown). The cylinder 10 is adapted to be rotated against the bias of a hair spring 14 by an eddy current speed cup 16 which is subjected to a rotating magnetic field in a construction well known and used in connection with conventional speedometers as presently used in automotive vehicles. These devices are generally used to indicate the speed at which the vehicle is moving, and the rotating magnet to create the rotating field is driven by a rotating part 18 connected to the automotive driving gear. This construction is conventional and will not be described in further detail.

The elongated cylinder or drum 10 is provided with a spiral stripe 20 which extends about its perimeter through an angle of 360 degrees, beginning and ending substantially in a longitudinal line 22 provided at a predetermined point on the cylinder which determines the zero point. Beginning at the line 22, indicia lines are provided which join to the spiral line, as shown, by being drawn normal to the line 22 and extending circumferentially of the cylinder. Heavy indicia lines 24 are preferably provided to indicate 10-mile increments, while light indicia lines 26 are positioned between the heavier lines to indicate 5-mile increments. It will be noted that the spiral line 20 and the indicia lines 24 and 26 are in the same surface, so that parallax is substantially obviated even though the angle in which observation is had from a lateral direction is large as will be described further hereinafter.

The longitudinal supporting shaft 12 is journaled in suitable bearings in a casing 28, which is provided with a bezel 30 holding a transparent face plate 32 in position, behind which an opaque face plate 34 is mounted in a conventional manner. The face plate 34 is pierced by a narrow longitudinal slot 36 in cooperative relation with the periphery of the cylinder 10, so that the spiral line or stripe 20 and the indicia lines 24 and 26 are clearly visible from the front side by an observer. Numerals 38 are provided either above or below the slot 36 to substantially coincide with the 10-mile stripes or lines 24 as is best seen in Fig. 2. Even though the tolerance allowable on the end play of the shaft 12 in its journals is large, so that the cylinder may move somewhat longitudinally, it will be seen that the 10-mile lines will still indicate a correct reading because this movement of the cylinder does not effect the actual reading or vary the reading by parallax since the indicia lines move with the spiral stripe and the reading is determined by the relation of the spiral stripe 20 and the bottom edge 36A of the longitudinal slot 36. This relation is essentially changed only by transverse movement of the periphery of the cylinder and not by its longitudinal movement obtained by end play of the cylinder.

Figure 5:
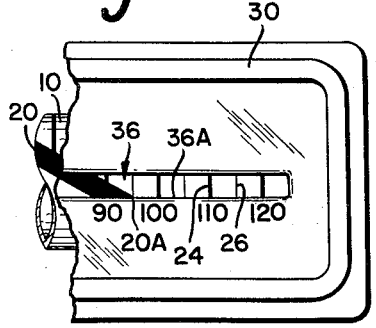
Fig. 5 is an elevational view, similar to Fig. 2, without reflective surfaces.

In Fig. 5, this arrangement is shown where the leading point 20A of the spiral stripe 20, coacts with the bottom edge 36A of the slot 36 to indicate a reading of 95 miles per hour on the speedometer.

In order to improve the visibility to an observer of the reading, an oblique reflective surface 40 is provided to establish more clearly the bottom edge 36A of the slot 36, so that an observer will see both the spiral stripe 20 and its reflection 42 in the reflective surface 40. This creates the effect of an arrow head by the combination of the reflection 42 with the angularity of the spiral stripe 20, as is best seen in Fig. 2, to clearly point to the reading to be indicated, which, in Fig. 2, is approximately 38 miles per hour. An observer would then see both the visible portion of the stripe 20, as seen through the slot 36, and the reflection 42 of this portion of the stripe 20 in the reflective surface 40, beginning adjacent the leading point 20A and extending back therefrom, as shown, to provide a substantially symmetrical arrowhead in visual effect. The angle of obliqueness may be varied to suit the relation of the cooperating parts to attain this result. The reflective surface is suitably mounted on a flange 44 by cementing or the like which is provided on a web 46 affixed to the interior of the casing 28 in any convenient manner.

Figures 3, 6, 7:
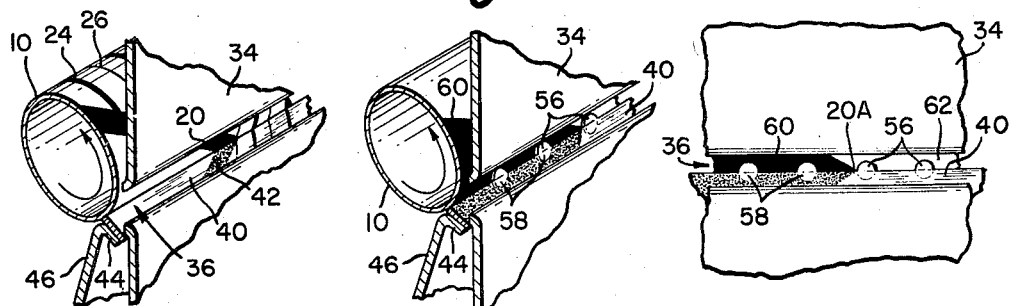
Fig. 3 is a perspective view in end section of the instrument shown in Fig. 2.
Fig. 6 is a perspective view similar to Fig. 3 with the indicia on a fixed surface.
Fig. 7 is an elevational view of a portion of the device shown in Fig. 6 showing the visual effect thereof.
Figure 4:
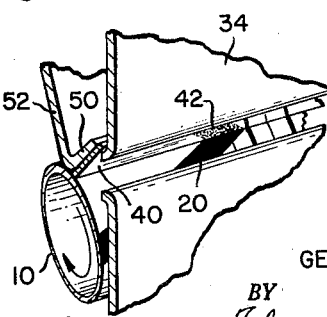
Fig. 4 is a perspective view similar to Fig. 3 with the reflective surface in changed position.

Referring to Fig. 4, the reflective surface 40 may be positioned adjacent the upper side of the slot by being mounted on an upwardly-extending flange 50 forming a part of mounting plate 52 affixed to the casing 28 in any convenient manner. The reflection 42 will then be positioned above the visible portion of the spiral stripe, as shown, to create the effect to an arrowhead as described before in relation to Figs. 2 and 3.

If desired, the indicia lines 24 and 26 on the surface of the cylinder 10 may be removed and half circle indicia 56 may be struck up from the flange 44, as shown, in Figs. 6 and 7. These new indicia 56 will be colored in a contrasting color arrangement which will also be reflected by the reflective surface 40 as circles 58, set off against the contrast of the background formed by a darker color which terminates in the leading point 20A of the spiral portion 60 of the cylinder, as is best seen in Fig. 7. The indicating leading point 20A of the darker half of the cylinder surface will form an arrowhead by its contrast with the remaining lighter portion 62 of the cylinder as divided by the spiral line when reflected in the surface 40. Obviously the same arrangement could be applied to the device shown in Fig. 4 where the reflective surface is mounted above the longitudinal slot 36.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a speedometer having an in-line indication of the speed of a vehicle, a casing, an elongated rotatable indicating drum mounted in the casing in horizontal position, a driving means connected to the driving gear of the vehicle to position the drum in an angular position related to the speed of the vehicle, a sheet of opaque material mounted in the casing in front of the drum, a narrow slot in the opaque sheet cooperating closely with the outer surface of the drum to make a portion thereof visible to an operator of the vehicle, a spiral indicating stripe on the surface of the drum in contrasting color therewith to cooperate with an edge of the slot to give an indication to the operator of the angular position of the drum, spaced scale lines on the same surface of the drum as the spiral indicating stripe also visible through the slot, indicia numbers on a portion of the casing in related juxtaposed position to the scale lines on the drum as viewed through the slot by the operator, and a reflective surface cooperating with the slot edge to reflect an image of the spiral indicating stripe and the scale lines to the operator.

2. In a speedometer having an in-line indication of the speed of a vehicle, a casing, an elongated rotatable indicating drum mounted in the casing in horizontal position, a driving means connected with the driving gear of the vehicle to position the drum in an angular position related to the speed of the vehicle, a sheet of opaque material mounted in the casing in front of the drum, a narrow slot in the opaque sheet cooperating closely with the outer surface of the drum to make a portion thereof visible to an operator of the vehicle, a spiral indicating stripe on the surface of the drum in contrasting color therewith to cooperate with an edge of the slot to give an indication to the operator of the angular position of the drum, spaced scale lines on the outer surface of the drum positioned only on the forward side of the spiral indicating stripe, and indicia numbers on a portion mounted in the casing in related juxtaposed position to the scale lines on the drum as viewed through the slot by the operator.

References Cited in the file of this patent

UNITED STATES PATENTS

| | | |
|---|---|---|
| 1,303,126 | Stevens | May 6, 1919 |
| 1,384,809 | Smith | July 19, 1921 |
| 1,532,548 | Ramsey | Apr. 7, 1925 |
| 1,671,272 | Buckingham | May 29, 1928 |
| 1,871,877 | Buckman | Aug. 16, 1932 |
| 2,272,574 | Nothe | Feb. 10, 1942 |
| 2,394,287 | Bludworth | Feb. 5, 1946 |
| 2,678,621 | Proctor | May 18, 1954 |
| 2,802,442 | Helgeby | Aug. 13, 1957 |

FOREIGN PATENTS

| | | |
|---|---|---|
| 206,232 | Great Britain | Nov. 1, 1923 |
| 664,177 | France | Aug. 30, 1929 |